UNITED STATES PATENT OFFICE.

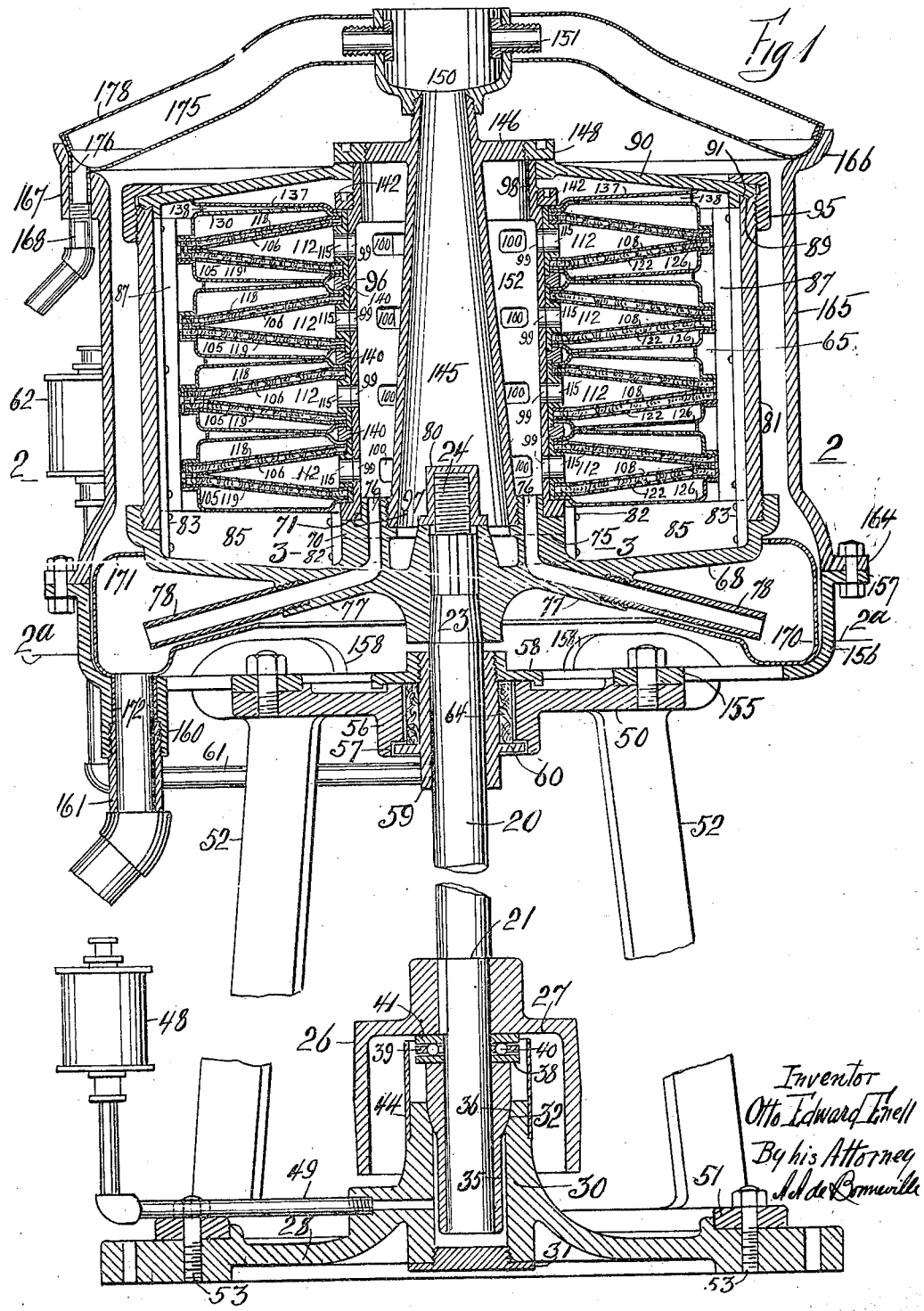

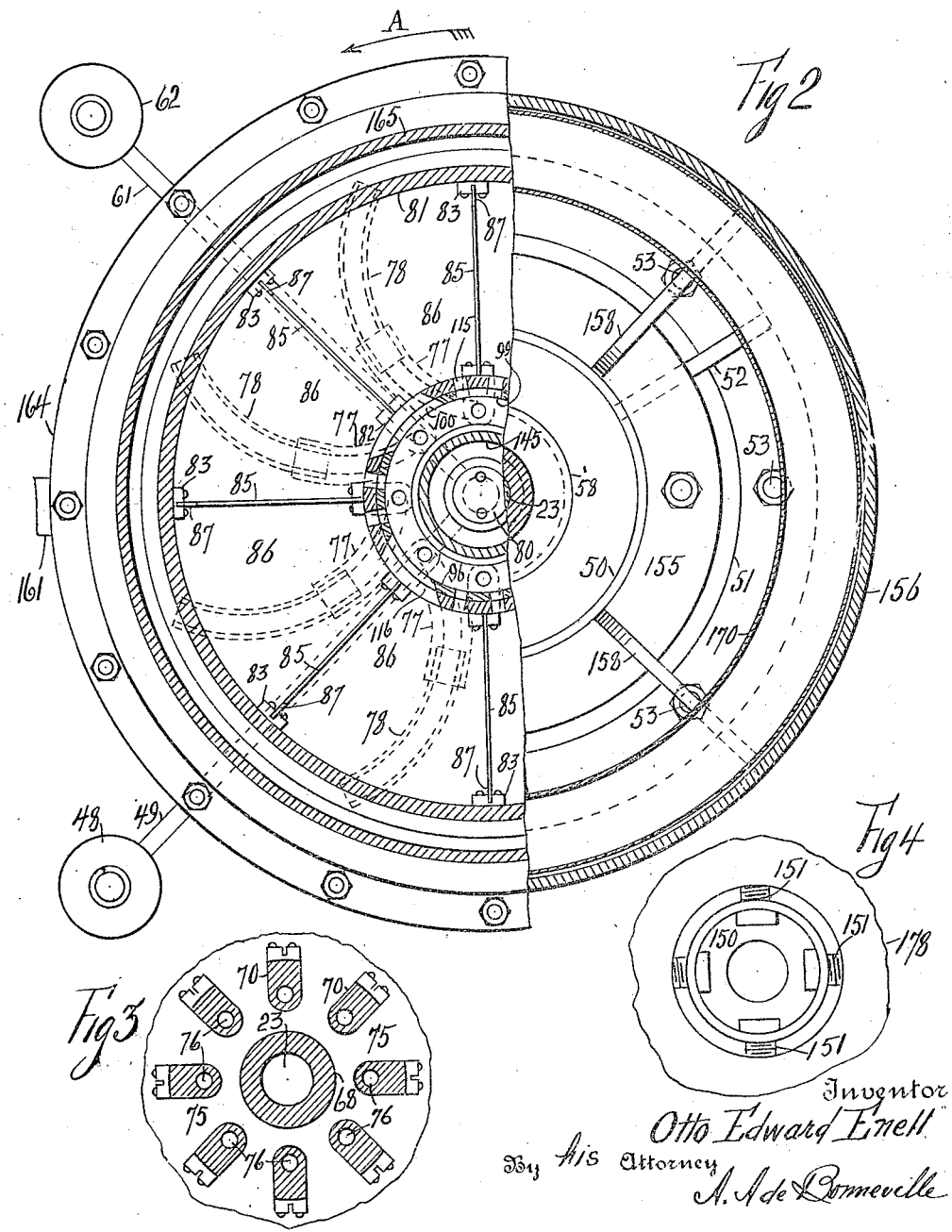

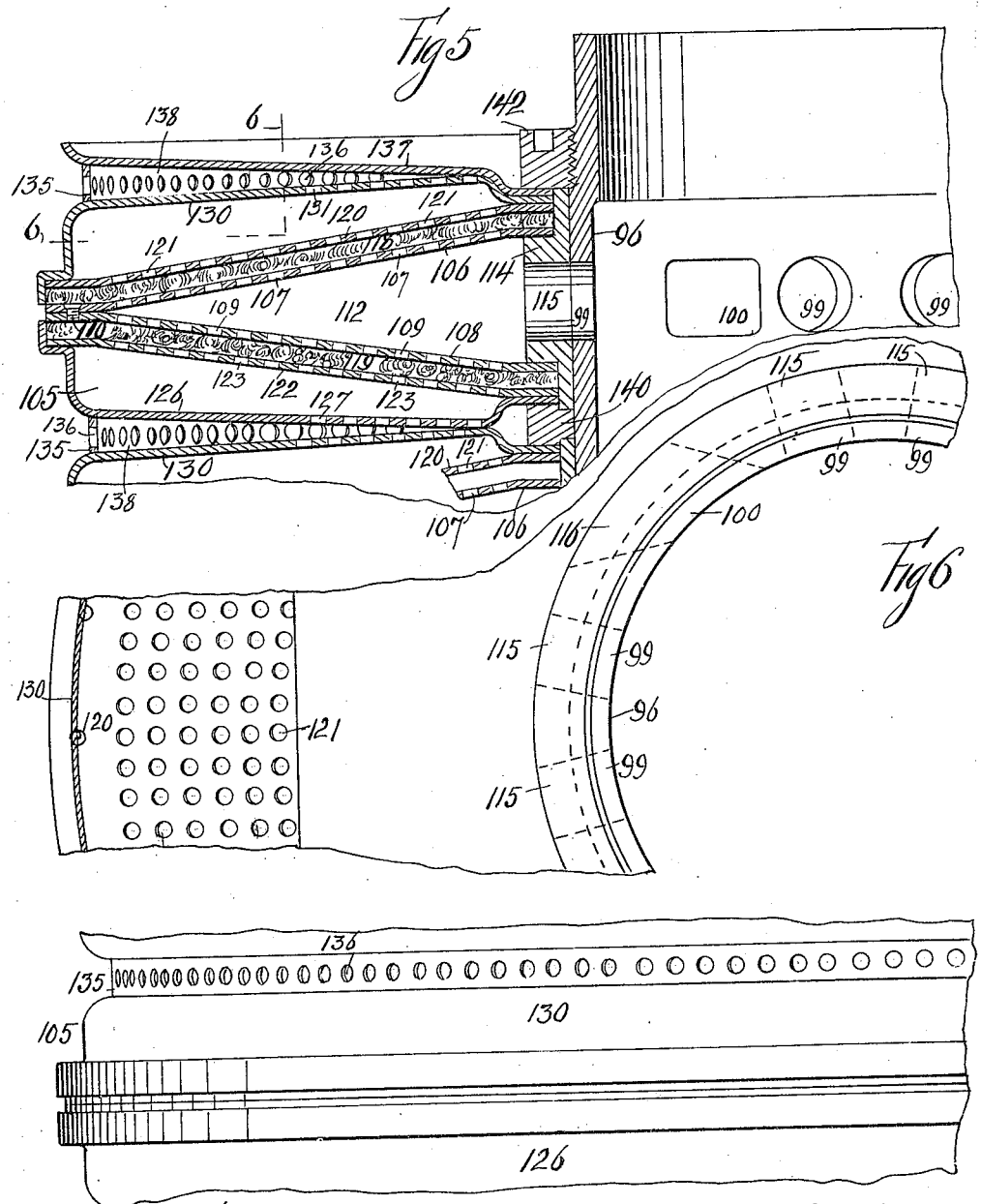

OTTO EDWARD ENELL, OF JERSEY CITY, NEW JERSEY.

CENTRIFUGAL FILTERING AND CLARIFYING APPARATUS.

1,269,067.  Specification of Letters Patent.  Patented June 11, 1918.

Application filed October 12, 1916. Serial No. 125,170.

*To all whom it may concern:*

Be it known that I, OTTO EDWARD ENELL, a citizen of the United States, and a resident of Jersey City, in the county of Hudson and State of New Jersey, have invented certain new and useful Improvements in a Centrifugal Filtering and Clarifying Apparatus, of which the following is a specification.

This invention relates to a centrifugal filtering and clarifying apparatus. The invention is primarily used to filter and clarify varnishes, oils, syrups, extracts and in fact any fluid which is to be disintegrated, or in which solid particles held in suspension are to be separated. The organization of the invention comprises primarily a rotating bowl containing a plurality of filter frames rotating therewith. Special curved discharge pipes are provided for the bowl, to insure the efficient discharge of the filtered fluid. The apparatus is constructed so that the separate parts thereof can be easily detached and cleaned, and the deposited sediment easily removed.

The curved discharge pipes turning with the bowl and the resulting centrifugal force produces partial vacuums in the pipes, and thereby enhances the easy discharge of the treated fluid from said pipes.

In the drawings, Figure 1 represents a partial vertical axial section of the apparatus; Fig. 2 shows horizontal sections as on the lines 2, 2 and 2ᵃ, 2ᵃ of Fig. 1; Fig. 3 represents a section as on the line 3, 3, of Fig. 1; Fig. 4 shows a fragmentary top plan view of a portion of Fig. 1 when not sectioned; Fig. 5 shows an enlarged fragmentary portion of Fig. 1; Fig. 6 represents a top plan view and section of Fig. 5 on the broken line 6, 6; and Fig. 7 represents a partial front view of Fig. 5 when not sectioned.

A vertical driving shaft 20 is shouldered at 21 adjacent to its lower end, tapered at its upper end 23 and has the threaded portion 24. A driving pulley 26 with the inner top face 27 is keyed to the lower portion of the shaft 20. A supporting base 28 has formed therewith the vertical sleeve 30, which latter is threaded at its lower end for the plug 31. At the upper inner end of the sleeve 30 is formed the spherical seat 32. A loose sleeve 35 with a spherical bearing surface 36 extends into the sleeve 30, the spherical surface 36 registers with the seat 32. Upon the sleeve 35 is located the ring 38 and above the latter is indicated the ball bearing ring 39 for the ball bearings 40. A second ring 41 similar to 38 bears upon the ball bearings 40. The inner top face 27 of the pulley 26 is supported upon the ring 41. A sleeve 44 extends from the upper portion of the sleeve 30, to within close proximity of the inner top face 27 of the pulley 26. An oil cup 48 is connected to the inner portion of the sleeve 30 by means of the piping 49. A supporting frame is shown with the upper table 50 and lower foot ring 51. The ring and the table are connected by three legs 52, and the said ring 51 is bolted to the supporting base 28 by means of the bolts 53. The table 50 has formed therewith the sleeve 56, having a counterbore 57. A cap 58 is supported upon the sleeve 56 and carries in threaded engagement therewith the guide sleeve 59. The latter has formed therewith the flange collar 60, which latter extends into the counterbore 57. Piping 61 is in threaded engagement with and extends through the sleeve 59 at its lower end, and at its upper end carries the oil cup 62. Fibrous packing 64 is located between the sleeves 56 and 59 and is supported upon the collar 60. The coaction of the cap 58, sleeves 56, 59 and the packing 64 produce a flexible bearing for the shaft 20. A bowl is indicated in its entirety by the numeral 65 and comprises the base 68 which is keyed to the upper end of the shaft 20. A sleeve 70 with the shouldered portion 71 extends up from the base 68 and has formed therein a plurality of radial inlet openings 75. The openings 75 constitute inlet ports to the bowl 65. Outlet ports 76 are formed in the sleeve 70 and extend through the base 68, the latter having formed therewith the threaded bosses 77. The portion of the ports 76 which are located in the bosses 77 are curved as shown in Fig. 2. Curved discharge pipes 78 extend from the bosses 77. The curvature of the pipes 78 and the ports in the bosses 77, enhance the discharge of the fluid from the apparatus during the rotation of the bowl 65. A cap nut 80 engages the threaded end 24 of the shaft 20. A barrel 81 is in threaded engagement with the base 68 and constitutes the side wall of the bowl 65. Guide clips 82 are fastened to the inner wall of the base 68 and guide clips 83 have their lower ends fastened to the inner face of the outer wall of said base, and the upper ends of the clips 83 are fastened to the inner face of the barrel 81. The said clips have slots for the removable partitions 85 which form collecting chambers 86 in said base 68.

Retarding shelves 87 are located in the slots of the clips 83 and bear upon their accompanying partitions 85. The barrel 81 has formed at its top edge a V shaped groove 89. A cap 90 is carried upon the wall 81 and has a V shaped projection 91, which seats in the groove 89. A ring nut 95 is in threaded engagement with the upper end of the wall 81 and locks the cap 90 thereto. Upon the shouldered portion 71, of the sleeve 70, is supported a sleeve 96 having the foot 97, and the contracted upper end 98. A plurality of radial openings 99, and a plurality of elongated tangential openings 100 are formed in said sleeve 96. The vertical side walls of the openings 100 are tangential to a circle concentric with the sleeve 96, and of somewhat smaller diameter to secure the easy ingress of the fluid from the bowl 65 into said sleeve 96. Upon the sleeve 96 are detachably supported a plurality of filter frames each of which is indicated in its entirety by the numeral 105. Each filter frame comprises the upper central conoidal filter plate 106 with perforations 107, and the lower conoidal filter plate 108 with the perforations 109. The plates 106 and 108 are secured to each other at their outer ends by screws 110. An inner conoidal receiving chamber 112 is formed between the plates 106 and 108. A ring 114 engages the inner ends of the plates 106 and 108, and has formed therewith the radial openings 115 which register with the openings 99, and tangential openings 116 which register with the openings 100, of the sleeve 96. Next to the plates 106 and 108 are located filter cloths 118 and 119 respectively, or other appropriate filtering media provided. Next to the filter cloth 118 is located the conoidal filter plate 120 with the perforations 121, and next to the filter cloth 119 is located the conoidal filter plate 122 with the perforations 123. A conoidal supporting casing 126 with the perforations 127 carries at its inner end, the inner portion of the plate 122, and at its outer end carries the outer end of said plate. A conoidal upper casing 130 with the perforations 131, bears at its inner end upon the inner portion of the plate 120, and at its outer end bears upon the outer portion of the plate 120. From each upper casing 130 extends a ring 135 having the perforations 136. Each ring 135 supports the lower casing 126 of the next above filter frame 105, and the uppermost ring 135, supports the top conoidal unperforated casing 137. The casing 126 of the lowermost filter frame 105 is supported upon the partitions 85. Between the inner ends of the casings 126 and 130 are located the separator rings 140. Between the casings 126 and 130, and between the casings 130 and 137 are formed conoidal inlet ducts 138. Upon the inner end of the casing 137 bears the ring nut 142, which is in threaded engagement with the upper end of the sleeve 96.

Within the sleeve 96 is located the tapered inlet duct 145, which at its lower end is in threaded engagement with the sleeve 70 of the base 68. A threaded flange 146 extends from the outer upper end of the inlet duct 145. A ring nut 148 is in threaded engagement with the flange 146 and bears upon the cap 90. A receiving basin 150 is in threaded engagement with the upper end of the inlet duct 145. The said basin has extending therefrom a plurality of detachable overflow nozzles 151. An annular chamber 152 is formed between the sleeve 96 and the inlet duct 145. Upon the upper table 50 is bolted the ring member 155 of an outer lower casing 156, having the flange 157. Ribs 158 connect the said ring member 155 and the casing 156. The casing 156 has formed therewith a threaded outlet nozzle 160. Discharge piping 161 is in threaded engagement with the nozzle 160. Upon the flange 157 of the casing 156 is supported the flange 164 of the upper outer casing 165. A curved supporting flange 166 is formed at the upper end of the casing 165. With the flange 166 is formed a threaded boss 167, and from the latter extends the overflow piping 168. An annular discharging trough 170 with the hood 171 is supported in the casing 156. A discharging nozzle 172 leads from the trough 170 and extends into the nozzle 160. An overflow receptacle 175 with the overflow nozzle 176 is supported upon the curved supporting flange 166. The nozzle 176 extends into the boss 167. A detachable cover 178 is provided for the overflow receptacle 175.

To operate the apparatus rotation is transmitted to the driving pulley 26 by means of a belt (not shown) and thereby the driving shaft 20, with the bowl 65, and all parts fixed with the latter are turned. It is to be understood that the casing 165, the discharging trough 170 and the overflow receptacle 175 remain stationary during the rotations of the shaft 20. The coaction of the spherical seat 32 of the sleeve 30, the spherical surface 36 of the sleeve 35, and the fibrous packing 64 enables the vertical axis of the shaft 20 to deviate from its normal vertical position during its rotations. The liquid to be treated is poured into the receiving basin 150, and any overflow thereof escapes through the outlet nozzle 151, to be discharged by the outlet piping 168. From the basin 150 the fluid enters the inlet duct 145 and from the latter enters the bowl 65, by way of the radial inlet openings 75. The greater portion of the mechanically mixed solids of the fluid are trapped and remain in the collecting chambers 86 during the rotation of the bowl 65. The somewhat lighter mixed solids of the fluid by virtue of centrifugal force due to the rotations of the bowl 65 impinge against the barrel 81 of said bowl and are deposited into said collecting chambers. The rising fluid next encounters the retarding shelves 87, by virtue of which slippage between the fluid and the wall 81 is prevented, that is to say the fluid travels with the bowl, and any tendency for the bowl to travel faster than the fluid is prevented. During the rotations of the bowl 65, the fluid therein rises and enters the perforations 136 of the rings 135 by means of which a partial filtration takes place and the fluid then flows into and through the conoidal inlet ducts 138. From the latter the fluid first flows through the perforations 127 and 131. The fluid then flows through the perforations 121 and 123, and then it is filtered by the filter cloths 118 and 119. The fluid then flows through the perforations 107 and 109 into the conoidal receiving chamber 112, to be deposited into the annular chamber 152 by way of the openings 116, 100, 115, and 99. The direction of the side walls of the tangential openings 116 and 100, enables the efficient and easy flow of the filtered fluid therethrough. The fluid next enters the outlet ports 76 to be discharged by the curved discharge pipes 78, into the annular discharging trough 170.

The direction of rotation of the bowl is indicated by the arrow "A", Fig. 2, and the curvature of the pipes 78, in conjunction with the direction of rotation of the bowl, enhances the discharge of the filtered fluid through said pipes 78. From the trough 170 the fluid is discharged by means of the nozzle 172 and the discharge piping 161.

From the drawings and description thereof it will be noted that the filter frames 105 can be easily detached from the apparatus, by removing the ring nuts 95, 142 and 148. The conoidal members 106 and 108 can be separated by removing the screws 110. The partitions 85, and the retarding shelves 87 can be easily lifted out of their guide clips. In fact all the elements of the invention can be easily separated from one another, so that a new charge of material and a cleaned apparatus can always be obtained.

Having described my invention what I desire to secure by Letters Patent and claim is:

1. In an apparatus of the character described the combination, of a rotative bowl, means to introduce a fluid to be treated into said bowl, a sleeve having openings in said bowl, a plurality of filter frames mounted on said sleeve, each filter frame having formed therewith an inner receiving chamber and filtering means coacting with each chamber.

2. In an apparatus of the character described the combination, of a rotative bowl, means to introduce a fluid to be treated into said bowl, a sleeve having openings in said bowl, a plurality of detachable conoidal filter frames mounted on said sleeve, each filter frame having formed therewith an inner receiving chamber and filtering means coacting with said chamber.

3. In an apparatus of the character described the combination, of a rotative bowl, means to introduce a fluid to be treated into said bowl, a sleeve having openings in said bowl, a plurality of detachable filter frames each having formed therewith an inner receiving chamber carried on said sleeve and filtering means coacting with said chambers.

4. In an apparatus of the character described the combination, of a rotative bowl, means to introduce a fluid to be treated into said bowl, a sleeve having openings in said bowl, a plurality of filter frames mounted on said sleeve and a plurality of removable partitions in the base of said bowl.

5. In an apparatus of the character described the combination, of a rotative bowl, means to introduce a fluid to be treated into said bowl, a sleeve having openings in said bowl, a plurality of filter frames mounted on said sleeve and a plurality of removable retarding shelves at the inner face of the wall of the bowl.

6. In an apparatus of the character described the combination, of a rotative bowl, means to introduce a fluid to be treated into said bowl, a plurality of filter frames in said bowl, perforated conoidal casings for each filter frame and a ring having perforations between the outer end of the casing of one frame and the outer end of the accompanying casing of the next adjacent filter frame.

7. In an apparatus of the character described the combination, of a rotative bowl, means to introduce a fluid to be treated into said bowl, a sleeve carried in the bowl having tangential openings, and filter frames on said sleeve coacting with said openings.

8. In an apparatus of the character described the combination, of a rotative bowl, having ports in its base, means to introduce a fluid to be treated into said bowl, a sleeve having openings carried in said bowl, filter frames mounted on said sleeve and coacting with the openings thereof, and curved discharge pipes carried by the bowl coacting with said ports.

9. In an apparatus of the character described the combination, of a rotative bowl, an inlet duct for the bowl, a receiving basin for said inlet duct, overflow nozzles for said basin, a sleeve connected to said bowl having openings, a plurality of detachable filter frames mounted on said sleeve, each filter frame having formed therewith an inner receiving chamber and filtering means coacting with each chamber.

10. In an apparatus of the character described the combination, of a rotative bowl, an inlet duct for said bowl, a receiving basin for the inlet duct, overflow nozzles for said basin, an overflow receptacle coacting with said overflow nozzles, a sleeve with openings connected to said bowl, a plurality of detachable filter frames mounted on said sleeve, each filter frame having formed therewith an inner receiving chamber and filtering means coacting with each chamber.

11. In an apparatus of the character described the combination, of a rotative bowl having ports in the base, a sleeve for said bowl having openings, detachable filter frames mounted on said sleeve and coacting with the openings of said sleeve, and curved discharge pipes carried by the bowl coacting with its ports.

12. In an apparatus of the character described the combination, of a rotative bowl, means to introduce a fluid to be treated into said bowl, a plurality of filter frames in said bowl, perforated casings for each filter frame and a ring having perforations between the outer end of the casing of one frame and the outer end of the accompanying casing of the next adjacent filter frame.

13. In an apparatus of the character described the combination, of a rotative bowl having ports in its base, means to introduce a fluid to be treated into said bowl, a sleeve with openings in said bowl, filter frames detachably mounted on said sleeve and curved discharge pipes carried by the bowl and coacting with said ports.

14. In an apparatus of the character described the combination, of a rotative shaft, a bowl attached to said shaft, a sleeve having tangential openings in said bowl, filtering means in said bowl and curved discharge pipes at the lower end of said sleeve to enhance the flow of fluid therefrom.

Signed at the borough of Manhattan, city of New York, in the county of New York and State of New York, this 23rd day of September, A. D. 1916.

OTTO EDWARD ENELL.

Witnesses:
A. A. DE BONNEVILLE,
A. W. BAKER.